US011616707B2

(12) United States Patent
Padfield et al.

(10) Patent No.: US 11,616,707 B2
(45) Date of Patent: *Mar. 28, 2023

(54) ANOMALY DETECTION IN A NETWORK BASED ON A KEY PERFORMANCE INDICATOR PREDICTION MODEL

(71) Applicant: VIAVI Solutions Inc., San Jose, CA (US)

(72) Inventors: Dave Padfield, Marlborough (GB); Yannis Petalas, Newbury (GB); Oliver Parry-Evans, Marlborough (GB)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,469

(22) Filed: Nov. 18, 2021

(65) Prior Publication Data
US 2022/0078098 A1 Mar. 10, 2022

Related U.S. Application Data

(63) Continuation of application No. 16/730,691, filed on Dec. 30, 2019, now Pat. No. 11,190,425.

(51) Int. Cl.
H04L 43/0823 (2022.01)
H04L 43/04 (2022.01)
H04L 43/16 (2022.01)

(52) U.S. Cl.
CPC .......... H04L 43/0823 (2013.01); H04L 43/04 (2013.01); H04L 43/16 (2013.01)

(58) Field of Classification Search
CPC ...... H04L 43/0823; H04L 43/04; H04L 43/16
See application file for complete search history.

(56) References Cited

U.S. PATENT DOCUMENTS

| 9,900,790 B1 | 2/2018 | Sheen et al. |
| 10,181,982 B2 | 1/2019 | Tapia et al. |
| 10,361,935 B2 | 7/2019 | Udupi et al. |
| 10,685,260 B1 | 6/2020 | Adelaar et al. |

(Continued)

FOREIGN PATENT DOCUMENTS

| EP | 3438899 A1 | 2/2019 |
| WO | 2018157951 A1 | 9/2018 |

OTHER PUBLICATIONS

Extended European Search Report for Application No. EP20217705.1, dated May 17, 2021, 9 pages.

Primary Examiner — Viet D Vu
(74) Attorney, Agent, or Firm — Harrity & Harrity, LLP

(57) ABSTRACT

A network monitoring platform may obtain a measurement of a particular value of a key performance indicator (KPI) and one or more parameters of the particular value of the KPI. The network monitoring platform may determine a prediction of the particular value of the KPI. The network monitoring platform may determine an amount of error in the prediction of the particular value of the KPI, wherein the amount of error in the prediction of the particular value of the KPI is based on a difference between the prediction of the particular value of the KPI and the measurement of the particular value of the KPI. The network monitoring platform may perform, based on the amount of error in the prediction of the particular value of the KPI, one or more actions.

20 Claims, 11 Drawing Sheets

(56) References Cited

U.S. PATENT DOCUMENTS

| | | |
|---|---|---|
| 10,990,284 B1 | 4/2021 | Savir et al. |
| 11,190,425 B2 | 11/2021 | Padfield et al. |
| 2014/0380131 A1* | 12/2014 | Ferguson ............... H04L 1/20 |
| | | 714/752 |
| 2016/0157114 A1 | 6/2016 | Kalderen et al. |
| 2019/0385019 A1* | 12/2019 | Bazrafkan ............ G06K 9/6273 |
| 2020/0242511 A1 | 7/2020 | Kale et al. |
| 2021/0103858 A1* | 4/2021 | Padmanabhan ........ G06N 20/20 |

* cited by examiner

ANOMALY DETECTION IN A NETWORK BASED ON A KEY PERFORMANCE INDICATOR PREDICTION MODEL

RELATED APPLICATION

This application is a continuation of U.S. patent application Ser. No. 16/730,691, filed Dec. 30, 2019 (now U.S. Pat. No. 11,190,425), entitled "ANOMALY DETECTION IN A NETWORK BASED ON A KEY PERFORMANCE INDICATOR PREDICTION MODEL," which is incorporated herein by reference in its entirety.

BACKGROUND

A network operator may monitor a network for errors that may need correction. To monitor a network, the network operator may receive alarms from a device that monitors the network. A measurement of a key performance indicator (KPI) may trigger an alarm for the network operator. For example, the measurement of the KPI may satisfy a static threshold to trigger the alarm. The KPI may relate to a single aspect or multiple aspects of network performance (e.g., latency, data rate, and/or the like) for a single communication link between endpoints or a group of communication links between endpoints. A network may include thousands or millions of communication links between endpoints, each of which may have multiple associated KPIs, and each of which may trigger an alarm.

DETAILED DESCRIPTION

Figure 1A:
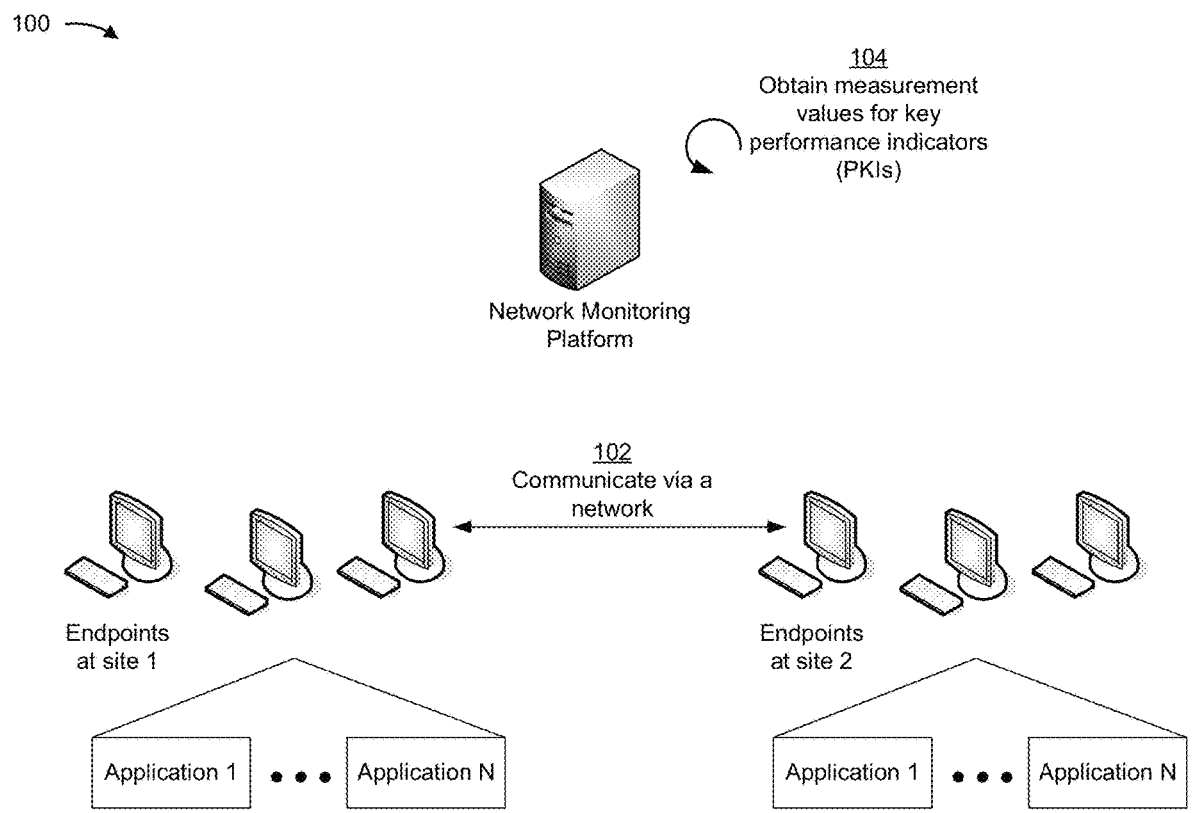
FIGS. 1A-1F are diagrams of one or more example implementations described herein.

The following detailed description of example implementations refers to the accompanying drawings. The same reference numbers in different drawings may identify the same or similar elements.

When operating a network, it is important for a network operator to be aware of errors in the network so that the network operator may take action to correct the errors. In some networks, the network operator may receive an alarm that indicates that an error may have occurred. A device of the network may generate the alarm based on a measurement of a KPI satisfying a static threshold for the alarm. For example, if the KPI relates to latency for communications between a first endpoint and a second endpoint, the device of the network may generate the alarm if the latency increases to a threshold for the latency KPI.

Some networks provide communication links between thousands or millions of endpoints. Each of the endpoints may communicate with multiple other endpoints, which may mean that the quantity of communication links may be a multiple of the quantity of endpoints. Further, multiple KPIs, related to multiple dimensions of the communication link, may be measured for each communication link. This means that, because the quantity of KPIs may be so great and an alarm may be generated for each KPI, the device of the network may generate an unusably high quantity of alarms for the network operator.

In some instances, the device of the network may generate an alarm based on satisfying the static threshold even though there is not an error to be corrected. For example, a measurement of a KPI may satisfy the static threshold for the alarm even though the measurement of the KPI is not irregular based on parameters of the KPI at the time of measurement (e.g., it may be normal for latency to increase for communications via an email application on a Monday morning at 9:00 AM based on high usage). Generating an alarm when the KPI measurement is not irregular may unnecessarily consume network resources and/or computing resources (e.g., processor resources, memory resources, power resources and/or the like) to provide the alarm for the KPI measurement, diagnose a cause of the alarm, and determine that the alarm does not indicate an error to be corrected. Additionally, generating an alarm when the KPI measurement is not irregular may reduce an amount of computing resources that may be spent by the network operator (e.g., using a network operator device) to address errors from irregular KPI measurements.

Some implementations described herein provide a network monitoring platform that obtains a measurement of a particular value of a KPI and one or more parameters of the particular KPI. The network monitoring platform determines a prediction of the particular value of the KPI, based on measurements of historical values of the KPI and associated parameters. The prediction may be based on providing, as an input to a KPI prediction model, the one or more parameters of the particular value of the KPI. The KPI prediction model may be trained using one or more machine learning processes (e.g., using a neural network) by providing, to the KPI prediction model, the historical values of the KPI and associated parameters.

Based on an amount of error in the prediction, the network monitoring platform may determine whether the particular value of the KPI is anomalous (e.g., irregular). To determine if the particular value of the KPI is anomalous, the network monitoring platform may determine if the amount of error in the prediction satisfies an anomaly threshold. The network monitoring platform may determine the anomaly threshold based on a prediction accuracy value (e.g., based on a portion of past predictions that satisfy an accuracy threshold). For example, the anomaly threshold may be relatively high when the prediction accuracy value is relatively low, to account for inaccuracies in the KPI prediction model. The prediction accuracy value and the anomaly threshold may be dynamically updated to account for continued training of the KPI prediction model. In some implementations, multiple anomaly thresholds may be used to indicate a severity of the anomaly. In some implementations, a first anomaly threshold may be used to indicate an anomaly based on a particular value of the KPI being too high and a second anomaly threshold may be used to indicate an anomaly based on the particular value of the KPI being too low.

In this way, the network monitoring platform may detect anomalies in the network, rather than merely detecting when a KPI value satisfies a static threshold. The network monitoring platform may detect anomalies with improved accuracy based on the anomaly threshold being a dynamic threshold. By detecting anomalies, the network monitoring platform may provide an improved set of alarms to the network operator. The improved set may include fewer alarms, more accurate identifications of errors that may need correction, and/or the like. In this way, the network monitoring platform may avoid consumption of network and computing resources for a device associated with a network operator to receive an alarm associated with a KPI value that is not irregular, diagnose a cause of the alarm, and determine that the alarm does not indicate an error to be corrected.

FIGS. 1A-1F are diagrams of one or more example implementations 100 described herein. As shown in FIGS. 1A-1F, the example implementation(s) 100 may include a network monitoring platform, endpoints, and/or the like.

As shown in FIG. 1A, and by reference number 102, endpoints at site 1 and endpoints at site 2 may communicate via a network. In some implementations, the endpoints at site 1 may communicate with the endpoints at site 2 via one or more application programming interfaces (APIs). During communication, data packets may be forwarded between site 1 and site 2 via network nodes of the network.

As shown by reference number 104, the network monitoring platform may obtain measurement values for KPIs related to one or more communications, via the network, between endpoints at site 1 and endpoints at site 2. In some implementations, the network monitoring platform may receive the measurement values from one or more network nodes of the network. The network monitoring platform may obtain the measurement values for the KPIs at regular timing intervals. For example, the network monitoring platform may obtain the measurement values for each monitored KPI every second, every minute, every 10 minutes, and/or the like. In some instances, the network monitoring platform may receive a null value at the regular timing interval based on an error or non-use of the communication link using a dimension to which the KPI relates.

KPIs may relate to communications associated with one or more dimensions such as a sending site, a receiving site, a virtual local area network (VLAN) identification, a virtual extensible local area network (VXLAN), a subnet associated with an endpoint, an API of the communication (e.g., an application used for the communication, a communication type, and/or the like), a protocol of the communication, a server name, a server network address, a server medium access control (MAC) address, an endpoint name, an endpoint network address, a country from which a data packet is sent, a country to which the data packet is sent, a user associated with the communication, a type of service associated with the communication, a server port, a client port, a request code a response code, a universal resource locator (URL) of a host, a voice over internet protocol (VOIP) address, and or the like. KPIs may relate to a performance indicator for one or more dimensions and may relate to unidirectional or bidirectional communications between the endpoints at site 1 and the endpoints at site 2. KPIs may relate to packet counts, total requests, total responses, bit rates, connection counts, average packets lost, control bit rates, packets out of order, latency, and/or the like. Additionally, KPIs may relate to various time intervals (e.g., 0.1 seconds, 1 second, 30 seconds, 1 minute, 1 hour, and/or the like).

Figure 1B:
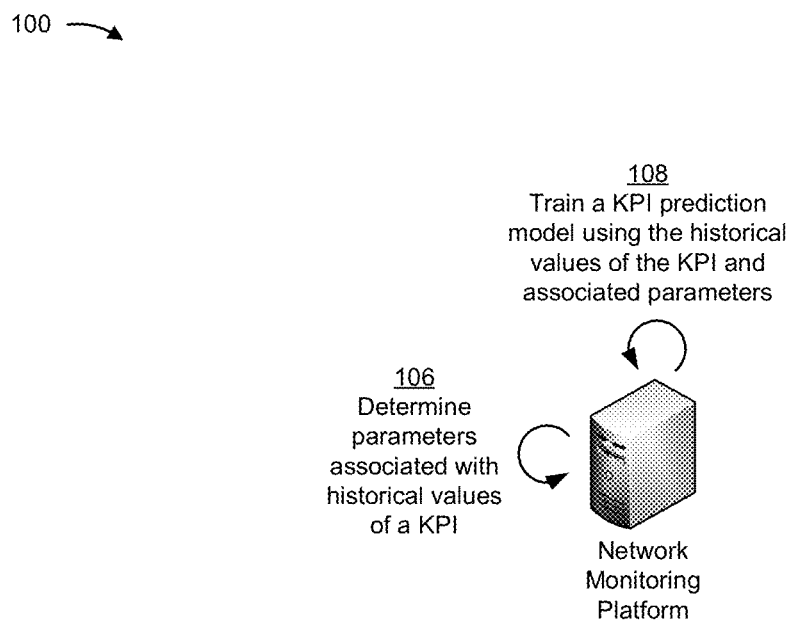

As shown in FIG. 1B, and by reference number 106, the network monitoring platform may determine parameters associated with historical values of a KPI. For example, the parameters may include, for one or more of the historical values of the KPI, a time of day associated with a measurement, a day of a week associated with the measurement, a date associated with the measurement, whether the measurement occurred on a holiday, whether the measurement occurred on a weekend, one or more previous values of the KPI, a trend of one or more previous values of KPI, and/or the like.

As shown by reference number 108, the network monitoring platform may train a KPI prediction model using the historical values of the KPI and the associated parameters. In some implementations, the network monitoring platform may train the KPI prediction model using one or more machine learning processes, using the historical values of the KPI and the associated parameters as training data. For example, the network monitoring platform may train the KPI prediction model using a neural network, as further described in reference to FIG. 1F.

The KPI prediction model may be configured in a training state until the KPI prediction model satisfies a training-related threshold. In some implementations, the KPI prediction model may be configured in a training state until a specified quantity of measured values for the KPI have been used for training the KPI prediction model. In some implementations, the KPI prediction model may be configured in a training state until a specified amount of time has passed during which the KPI prediction model receives measured values for the KPI. In some implementations, the KPI prediction model may be configured in a training state until the KPI prediction model satisfies a prediction accuracy threshold. When in a training state, the KPI prediction model may not attempt to identify an anomaly.

In some implementations, the KPI prediction model may determine a prediction for particular values of the KPI using historical values of the KPI that have one or more parameters that match one or more parameters of the particular values of the KPI. For example, the KPI prediction model may use only historical values of the KPI that were measured during the same period of time in a day and on the same day of the week as a particular value of the KPI that is to be predicted. In another example, the KPI prediction model may use only historical values of the KPI that were measured on the same holiday as the particular value of the KPI that is to be predicted.

Figure 1C:
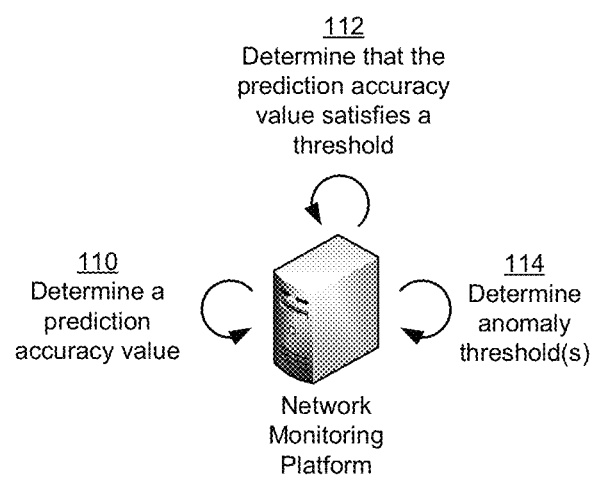

As shown in FIG. 1C, and by reference number 110, the network monitoring platform may determine whether a prediction accuracy value, for the KPI prediction model, satisfies a prediction accuracy threshold. The prediction accuracy value may represent a degree of accuracy of the KPI prediction model. The prediction accuracy value may be based on amounts of errors associated with predictions of historical values of the KPI. In some implementations, the network monitoring platform may use the KPI prediction model to determine predictions for one or more historical values of the KPI for which the network monitoring platform has access to a measured value. In this way, the network monitoring platform may train the KPI prediction model on a set of measured KPI values and associated parameters, and then determine a prediction accuracy value by predicting values for the same set of KPI values.

In some implementations, a prediction is determined to be erroneous if a difference between the prediction and a corresponding measured value satisfies a threshold. The prediction accuracy value may be based on a portion of predictions that are determined to be erroneous (e.g., the accuracy value may be 80% if differences between predictions and measured values are within the threshold 80% of the time).

In some implementations, the prediction accuracy value may be based on errors for the predictions of historical values that are weighted based on ages of the predictions (e.g., recent predictions may have a greater influence on the prediction accuracy value than relatively old predictions). In some implementations, the prediction accuracy value may be based on a root mean square of errors for the predictions of historical values. In some implementations, the prediction accuracy value may be based on a quantity of standard deviations that the amount of error is from a mean amount of error.

In this way, the network monitoring platform may adapt the KPI prediction model to changes in KPI values based on changes to the network (e.g., an addition or removal of network resources, a change in network protocol, and/or the like), changes to communication patterns between endpoints (e.g., because of a change of sites by one or more devices, a change in relationships between endpoints, and/or the like), changes in applications used to communicate between endpoints (e.g., a change to a different application for the communications, a change in protocol of the application, a change in services by the application, and/or the like), and/or the like. Adapting the KPI prediction model to changes affecting the KPI by weighting errors for the predictions of historical values based on ages may improve accuracy in the predictions. This may conserve network and computing resources that may otherwise have been used by a network operator device to receive and respond to relatively inaccurate alarms.

In some implementations, the network monitoring platform may configure the KPI prediction model in a testing state where the network monitoring platform uses the KPI prediction model to predict new KPI values. The network monitoring platform may then determine a prediction accuracy value based on the success of the KPI prediction model in predicting the new KPIs, as compared to corresponding measured values of the new KPIs (e.g., corresponding in time).

In some implementations, the network monitoring platform may determine a prediction accuracy value periodically. For example, the network monitoring platform may determine a prediction accuracy value for periods of 30 minutes, 1 hour, 6 hours, 12, hours, 24 hours, 2 days, 1 week, and/or the like. The network monitoring platform may determine the prediction accuracy value at subintervals of a period of time (e.g., every hour calculate a prediction accuracy value for a previous set of 6 hours). This may conserve computing resources that might otherwise be used to continuously calculate the prediction accuracy value in perpetuity, for a most recent period of time (e.g., continuously replacing oldest data with new data to maintain a consistently-sized set of data), and/or the like.

As shown by reference number 112, the network monitoring platform may determine whether the prediction accuracy value satisfies a threshold (e.g., an accuracy threshold). The accuracy threshold may indicate whether the KPI prediction model is sufficiently accurate for predicting values of the KPI and using the predictions to determine whether a particular KPI is anomalous. In some implementations, the accuracy threshold may relate to a portion of predictions that are within a threshold margin from a corresponding measured value of the KPI (e.g., 90% of predictions are within 10% of the measured value of the KPI). In some implementation, the accuracy threshold may be based on a root mean square or a coefficient of determination satisfying a threshold.

In some implementations, the network monitoring platform may weight accuracy of predictions based on ages of the predictions. This way, inaccuracies of older predictions may not prevent the KPI prediction model from satisfying the accuracy threshold, and accuracies of older predictions may not prevent the KPI prediction model from failing to satisfy the accuracy threshold when recent predictions are inaccurate).

As shown in FIG. 1C, and by reference number 114, the network monitoring platform may determine an anomaly threshold. Satisfaction of the anomaly threshold by an error between a prediction and a measured value of a particular value of the KPI may indicate that the particular value of the KPI is anomalous. In some implementations, the anomaly threshold may be the same as the threshold for determining if a prediction is erroneous when evaluating the prediction accuracy, as described above.

In some implementations, the anomaly threshold may be based on the prediction accuracy value. The anomaly threshold (e.g., a threshold amount of error to identify a KPI value as anomalous) may be inversely correlated to the prediction accuracy value, such that an increase in prediction accuracy results in a lower anomaly threshold. In other words, if the KPI prediction model is relatively accurate at predicting KPI values, a relatively small error may be used to identify a particular KPI as anomalous. The prediction accuracy value and the anomaly threshold may be dynamically configurable when the network monitoring platform trains and/or updates the KPI prediction model. In some implementations, the network monitoring platform may update one or more of the accuracy value and the anomaly value on a regular timing interval, continuously, by request from the network operator, and/or the like.

In some implementations, the anomaly threshold may be based on a weighted sum of a cumulative high, low, and/or average value of the KPI and a value of the KPI in a current or previous period or subinterval. In some implementations, values of the KPI in the current or previous period may be weighted with a small weight so that the value of the KPI in the current or previous period or subinterval does not have too great of an influence of the cumulative high, low, and/or average values of the KPI. For example, a cumulative average value of the KPI may be weighted with a 95% weight and an average value of the KPI in the current or previous period or subinterval may be weighted with a 5% weight such that a weighted sum of the cumulative average value of the KPI and the average value of the KPI in the current or previous period or subinterval may be considered a new or current cumulative average value of the KPI.

In some implementations, the average, high, and/or low values of the KPI in the current or previous period or subinterval may be modified before affecting the cumulative average, high, and/or low values of the KPI. For example, a specified amount or percentage of the highest and/or lowest values of the KPI (e.g., highest and lowest 10 values, highest and lowest 2.5% of values, and/or the like) may be removed before determining the average, high, and/or low values of the KPI in the current or previous period or subinterval.

In some implementations, the network monitoring platform may determine an upper anomaly threshold and a lower anomaly threshold such that a measurement of a particular value of the KPI is determined to be an anomaly if the particular value satisfies the upper anomaly threshold (e.g., by meeting or exceeding the upper anomaly threshold) or if the particular value satisfies the lower anomaly threshold (e.g., by meeting or falling below the lower anomaly threshold).

Figure 1D:
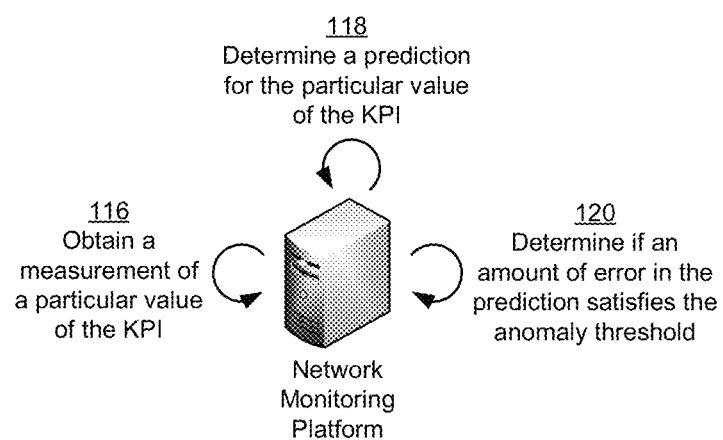

As shown in FIG. 1D, and by reference number 116, the network monitoring platform may obtain a measurement of a particular value of the KPI and one or more parameters of the particular value of the KPI. In some implementations, the network monitoring platform may determine to use the KPI prediction model to determine whether the particular value of the KPI is anomalous. For example, the network monitoring platform may determine to use the KPI prediction model based on the prediction accuracy value satisfying the threshold.

As shown by reference number 118, the network monitoring platform may determine a prediction for the particular value of the KPI. The prediction may be based on providing, as inputs, the parameters of the particular value of the KPI to the KPI prediction model. The prediction may be the output of the KPI prediction model. In some implementation, the network monitoring platform may determine the prediction before, concurrently with, or after obtaining the measurement of the particular value of the KPI.

Figure 1E:
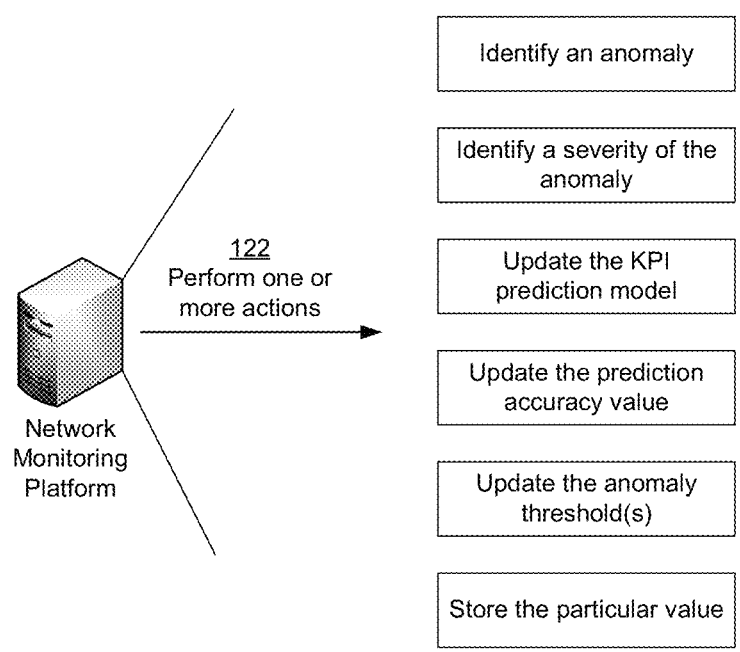

As shown by reference number 120, the network monitoring platform may determine if an amount of error in the prediction satisfies the anomaly threshold. The network monitoring platform may determine the amount of error in the prediction based on a difference in the measured value of the KPI and the prediction of the KPI. In some implementations, the network monitoring platform may determine if an amount of error in the prediction satisfies the anomaly threshold by comparing the amount of error with a probability value using a coefficient of determination (e.g., whether the amount of error is within a 95% confidence interval As shown in FIG. 1E, and by reference number 122, the network monitoring platform may perform one or more actions based on the amount of the error in the prediction. For example, the network monitoring platform may perform a first set of one or more actions based on the amount of error in the prediction satisfying the anomaly threshold, may perform a second set of one or more actions based on the amount of error in the prediction failing to satisfy the anomaly threshold, and/or may perform a third set of one or more actions regardless of the amount of error in the prediction satisfying the anomaly threshold.

In some implementations, the one or more actions may include identifying the particular value of the KPI as anomalous. The network monitoring platform may identify the particular value of the KPI as anomalous based on the amount of error in the prediction satisfying the anomaly threshold. In some implementations, the network monitoring platform provides, to a network operator device, an indication that the particular value of the KPI is anomalous. The indication may be included in an alert.

If the network monitoring platform identifies the particular value as anomalous, the network monitoring platform may identify a severity of the anomaly. In some implementations, the network monitoring platform may determine one or more additional anomaly thresholds to identify the severity of the anomaly. For example, the network monitoring platform may use the anomaly threshold as a first anomaly threshold to determine if a KPI value is anomalous. The network monitoring platform may then use a second anomaly threshold to determine if the KPI value is relatively severe (e.g., if the amount of error satisfies the second anomaly threshold). In some implementations, the network monitoring platform may determine that the particular KPI value has a low level of severity if the amount of error satisfies the first anomaly threshold but not the second anomaly threshold, a medium level of severity if the amount of error satisfies the first anomaly threshold and the second anomaly threshold but not a third anomaly threshold, and a high level of severity if the amount of error satisfies the first anomaly threshold, the second anomaly threshold, and a third anomaly threshold.

The network monitoring platform may use the measurement of the particular value of the KPI, and the one or more parameters associated with the measurement, to update (further train) the KPI prediction model. In some implementations, the network monitoring platform may further train the KPI prediction model or may provide the particular value of the KPI and the one or more parameters to another device to further train the KPI prediction model. In some implementations, the network monitoring platform may use the measurement of the particular value of the KPI and the one or more parameters to train KPI prediction model based on determining that the particular value of the KPI is not anomalous (e.g., the amount of error fails to satisfy the anomaly threshold), the prediction accuracy value fails to satisfy a prediction accuracy threshold, and or the like. In some implementation, the network monitoring platform continually updates the KPI prediction model with non-anomalous values of the KPI.

In this way, the network monitoring platform avoids training the KPI prediction model with anomalous inputs once the KPI prediction model is sufficiently accurate to determine whether the particular KPI value is anomalous. In some implementations, the network monitoring platform may use the particular value of the KPI to train the KPI prediction model dynamically or may store the particular value of the KPI to update the KPI prediction model periodically.

The network monitoring platform may use the measurement of the particular value of the KPI and/or the amount of error in the prediction to update the prediction accuracy value. In some implementations, the prediction accuracy value may increase or decrease based on whether the KPI prediction model identifies the particular KPI value as anomalous (e.g., the amount of error satisfies the anomaly threshold). In some implementations, the prediction accuracy value may increase, decrease, or remain the same based on whether the amount of error satisfies one or more other thresholds.

In some implementations, the network monitoring platform may update the value of the prediction accuracy value based on an amount of noise in a current period or subinterval of time. For example, the network monitoring platform may use the coefficient of determination to determine how much of the measured values of KPI in the current period or subinterval of time can be accounted for and how much of the measured values are noise that is based on measurement error. In some implementations, noise can be based on unpredictability and/or non-repeatability of a performance metric indicated by the KPI, a device being measured, a device performing the measuring, and/or the like.

In some implementations, the network monitoring platform may determine that the prediction accuracy value no longer satisfies an accuracy threshold. Based on the prediction accuracy value no longer satisfying the accuracy threshold, the network monitoring platform may cease providing anomaly detection for the network until the prediction accuracy value again satisfies the accuracy threshold.

In some implementations, the network monitoring platform may update the prediction accuracy value by determining an average of the amount of error in the prediction of the particular value of the KPI and amounts of respective errors in predictions of historical values of the KPI. The average may be a weighted average, with the weighting based on respective ages of the predictions of the historical values of the KPI (e.g., amounts of errors of older predictions may be weighted to have less of an effect on the prediction accuracy value than recent predictions). In some implementations, the amounts of errors of predictions older than a threshold are not used to determine the prediction accuracy value.

In some implementations, the network monitoring platform may update the prediction accuracy value periodically, upon identification of a quantity of KPI values as anomalous or not anomalous, by request from the network operator, and/or the like.

The one or more actions may include updating the anomaly threshold. In some implementations, the network monitoring platform may update the anomaly threshold based on updating the prediction accuracy value. In some implementations, the network monitoring platform may update the anomaly threshold to increase or decrease a likelihood of identifying an amount of error in a prediction as anomalous. For example, if the network operator requests fewer alerts (e.g., because the network monitoring platform and/or other network monitoring platforms have provided too many alerts), the network monitoring platform may increase the anomaly threshold in order to decrease a likelihood that fewer KPI values are identified as anomalous. In some implementations, the network monitoring platform monitors a plurality of KPI values for the network (e.g., using a plurality of KPI prediction models) and updates the anomaly threshold based on determining that the network monitoring platform has identified a quantity of anomalies that satisfies a threshold (e.g., a quantity of anomalies during a period of time). In this way, the network monitoring platform may be configured to identify a quantity of anomalies during a time period, where the quantity is likely to be within a range of quantities and/or is adjusted to increase a likelihood of providing a quantity within the range of quantities.

In some implementations, updating the anomaly thresholds may include updating a lower anomaly threshold and/or an upper anomaly threshold. For example, the network monitoring platform may update the lower anomaly threshold and/or the upper anomaly threshold based on a weighted sum of a cumulative high, low, and/or average value of the KPI and a value of the KPI in a current or previous period or subinterval.

Figure 1F:
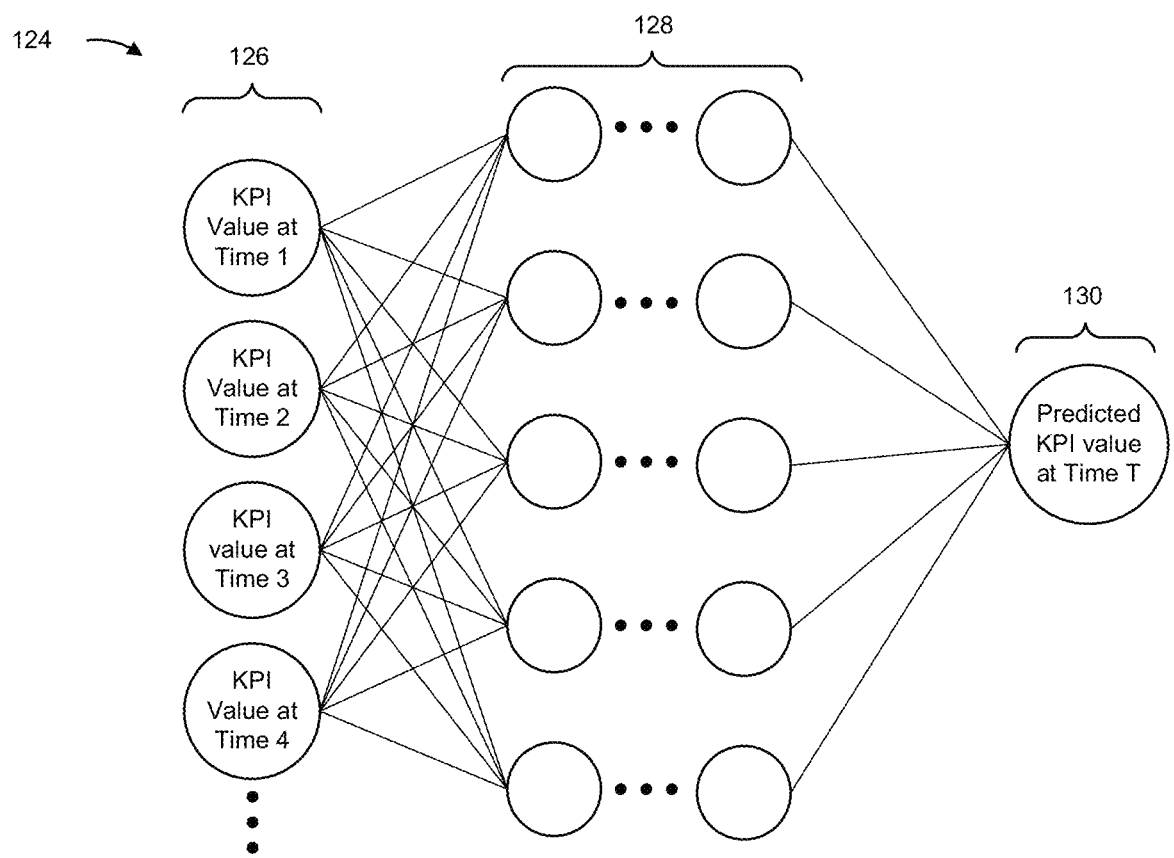

FIG. 1F is a diagram of an example implementation of a neural network 124 that may be used in to train the KPI prediction model discussed above. Neural network 124 is provided as an example. Other examples may differ from what is described in connection with neural network 124.

Neural network 124 may be used by the network monitoring platform to train the KPI prediction model or may be used by another device to train the KPI prediction model, which may be provided to the network monitoring platform. As shown, neural network 124 has an input layer 126, one or more intermediate layers 128 (referred to herein individually as "intermediate layer 128" and collectively as "intermediate layers 128"), and an output layer 130. As described herein, example neural network 124 may receive values for a set of parameters as inputs to input layer 126, use intermediate layers 128 to process the values for the set of parameters and determine a prediction for the particular value of the KPI at a specified time (e.g., a current value), and provide the prediction via output layer 130 of neural network 124. For example, the neural network may be configured to select prediction output based on outputs of nodes of the intermediate layers that account for one or more of the associated parameters of the particular value of the KPI.

As shown, input layer 126 receives values of the KPI and associated parameters at a plurality of times as inputs to neural network 124. If a value of the KPI at one or more of the plurality of times is missing, the neural network may be used to predict the missing values of the KPI, and use the prediction as inputs to neural network 124. Neural network 124 may use the intermediate layers (e.g., hidden layers) to determine the prediction of the particular value of the KPI based on the parameters associated with the particular value of the KPI. For example, the intermediate layers may include one or more feedforward layers and/or one or more recurrent layers to determine the prediction for the particular value of the KPI. The one or more feedforward layers and/or recurrent layers may include a plurality of coupled nodes that are linked according to being trained as described herein. In this way, links between nodes of intermediate layers 128 may correspond to predictions, classifications, and/or the like that are associated with the parameters that would lead to determining the prediction that is within a threshold range (or within a threshold level of accuracy) of a non-anomalous KPI value at time T. In some implementations, the output layer 130 may include a predicted KPI value at time T. in some implementations, the output layer 130 may include a range of non-anomalous values of the KPI at time T (e.g., between a lower anomaly threshold and an upper anomaly threshold).

Although a neural network is illustrated in FIG. 1*f*, other types of machine learning processes may be used to determine predictions of values of the KPI. For example, the network monitoring platform may use one or more artificial intelligence techniques, such as machine learning, deep learning, and/or the like to generate predictions of values of the KPI.

In some implementations, the network monitoring platform may determine a prediction for a particular value of the KPI using parameters associated with the KPI. For example, the network monitoring platform may train the KPI prediction model using information that includes historical values of the KPI (measured and/or predicted values) and a plurality of associated time-based parameters, a plurality of associated relationship parameters (e.g., proximity to recent measurements of values of the KPI, trends of recent measurements of values, and/or the like), and/or the like, to determine a prediction for a particular value of the KPI. As an example, the network monitoring platform may determine that past KPI values from weekends, are associated with a threshold probability of a value of the KPI that indicates relatively low failure rates, low latency, and/or the like. In some implementations, the KPI prediction platform may use a scoring system (e.g., with relatively high scores and/or relatively low scores) to identify and/or classify parameters as being associated with one another. In this case, the network monitoring platform may determine that a relatively high score (e.g., as being likely to influence the particular value of the KPI) is to be assigned to parameters that are determined to be the same or similar as previously identified parameters of similar historical KPI values. In contrast, the network monitoring platform may determine that a relatively low score (e.g., as being unlikely to influence the particular value of the KPI) is to be assigned to parameters that are determined to be different than previously identified parameters of dissimilar historical KPI values.

In some implementations, the network monitoring platform may perform a training operation when generating the KPI prediction model. For example, the network monitoring platform may portion historical values of the KPI and associated parameters into a training set (e.g., a set of data to train the KPI prediction model), a validation set (e.g., a set of data used to evaluate a fit of the KPI prediction model and/or to fine tune the KPI prediction model), a test set (e.g., a set of data used to evaluate a final fit of the KPI prediction model), and/or the like. In some implementations, the network monitoring platform may preprocess and/or perform dimensionality reduction to reduce the historical values of the KPI and the associated parameters to a minimum feature set. In some implementations, the network monitoring platform may train the KPI prediction model on this minimum feature set, thereby reducing processing to train the machine learning model, and may apply a classification technique, to the minimum feature set.

In some implementations, network monitoring platform may use a classification technique, such as a logistic regression classification technique, a random forest classification technique, a gradient boosting machine learning (GBM) technique, and/or the like, to determine a categorical outcome (e.g., that a parameter associated with the particular value of the KPI increases or decreases a value of the prediction of the KPI (e.g., relative to one or more previous values of the KPI), that the parameter associated with the particular value of the KPI does not increase or decrease the value of the prediction of the KPI (with a threshold confidence of correlation), and/or the like). Additionally, or alternatively, the network monitoring platform may use a naïve Bayesian classifier technique. In this case, the network monitoring platform may perform binary recursive partitioning to split the data of the minimum feature set into partitions and/or branches and use the partitions and/or branches to perform predictions (e.g., that a parameter increases, decreases, or does not affect a value of the prediction). Based on using recursive partitioning, the network monitoring platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the network monitoring platform may use a support vector machine (SVM) classifier technique to generate a non-linear boundary between data items in the training set. In this case, the non-linear boundary is used to classify test data (e.g., data relating to a time-based parameter, a relationship-based parameter, and/or the like) into a particular class (e.g., a class indicating that the that a parameter increases a value of the prediction, a class indicating that the parameter decreases the prediction, a class indicating the at the parameter does not affect the prediction (with a threshold confidence of correlation), and/or the like).

Additionally, or alternatively, the network monitoring platform may train the KPI prediction model using a supervised training procedure that includes receiving input to the KPI prediction model from a subject matter expert, which may reduce an amount of time, an amount of processing resources, and/or the like to train the KPI prediction model relative to an unsupervised training procedure. In some implementations, the network monitoring platform may use one or more other model training techniques, such as a neural network technique, a latent semantic indexing technique, and/or the like. For example, the network monitoring platform may perform an artificial neural network processing technique (e.g., using a two-layer feedforward neural network architecture, a three-layer feedforward neural network architecture, and/or the like) to perform pattern recognition with regard to patterns of whether parameters associated with historical values increases or decreases a value of the prediction of the KPI, or does not increase or decrease the value of the prediction of the KPI (with a threshold confidence of correlation), and/or the like. In this case, using the artificial neural network processing technique may improve an accuracy of the KPI prediction model generated by the network monitoring platform by being more robust to noisy, imprecise, or incomplete data, and by enabling the network monitoring platform to detect patterns and/or trends undetectable to human analysts or systems using less complex techniques.

As an example, the network monitoring platform may use a supervised multi-label classification technique to train the KPI prediction model. For example, as a first step, the network monitoring platform may map parameters to increasing the value of the prediction, decreasing the value of the prediction, or not affecting the value of the prediction. In this case, the parameters may be characterized as increasing the value of the prediction, not increasing the value of the prediction, or not affecting the value of the prediction based on characteristics of the parameters (e.g., whether a characteristic of a parameter is similar or associated with increasing, decreasing, or not affecting the value of the prediction) and an analysis of the parameters (e.g., by a technician, thereby reducing processing relative to the network monitoring platform being required to analyze each activity).

As a second step, the network monitoring platform may determine classifier chains, whereby labels of target variables may be correlated (e.g., in this example, labels may be parameters and correlation may refer to a common characteristic of the parameters in similarly increased, decreased, or unaffected historical values of the KPI). In this case, the network monitoring platform may use an output of a first label as an input for a second label (as well as one or more input features, which may be other data relating to the particular value of the KPI), and may determine a likelihood that particular parameter that includes a set of characteristic (some of which associated with a historical values of the KPI that were increased (relative to one or more recent values of the KPI), some of which associated with historical values of the KPI that were decreased, and some of which associated with historical values of the KPI that were unaffected) are associated with based on a similarity to other parameters that include similar characteristics. In this way, the network monitoring platform transforms classification from a multi-label-classification problem to multiple single-classification problems, thereby reducing processing utilization. As a third step, the network monitoring platform may determine a Hamming Loss Metric relating to an accuracy of a label in performing a classification by using the validation set of the data. For example, an accuracy with which a weighting applied to each parameter and whether each parameter is associated with increasing, decreasing, or not affecting the value of the prediction, results in a correct prediction of an expected value of the KPI, thereby accounting for differing amounts to which association of any one parameter influences the value of the prediction. As a fourth step, the network monitoring platform may finalize the KPI prediction model based on labels that satisfy a threshold accuracy associated with the Hamming Loss Metric and may use the KPI prediction model for subsequent prediction of whether parameters of a particular value of the KPI are to result in an increased, decreased, or unaffected value of the prediction.

As another example, the network monitoring platform may determine, using a linear regression technique, that a threshold percentage of parameters, in a set of parameters, do not affect historical values of the KPI, and may determine that those parameters are to receive relatively low association scores. In contrast, the network monitoring platform may determine that another threshold percentage of parameters increase or decrease the value of the prediction and may assign a relatively high association score to those parameters. Based on the parameters being associated with increasing or decreasing the value of the prediction, the network monitoring platform may generate the KPI prediction model and may use the KPI prediction model for analyzing new parameters that the network monitoring platform identifies.

In some implementations, a different device, such as a server device, may generate and train the KPI prediction model. The different device may send the KPI prediction model for use by the network monitoring platform. The different device may update and send (e.g., on a scheduled basis, on an on-demand basis, on a triggered basis, on a periodic basis, and/or the like) the KPI prediction model to the network monitoring platform.

Accordingly, the network monitoring platform may use any number of artificial intelligence techniques, machine learning techniques, deep learning techniques, and/or the like to determine a prediction of a particular value of the KPI.

By using the KPI prediction model to make predictions of a particular value of the KPI, determining the amount of error in the prediction, and then determining if the amount of error means that the KPI value is anomalous, the network monitoring platform may detect anomalies in the network, rather than merely detecting when a KPI value satisfies a threshold. By detecting anomalies, the network monitoring platform may provide an improved set of alarms to the network operator. The improved set of alarms may include fewer alarms, more accurate identifications of errors that may need correction, and/or the like. In this way, the network monitoring platform may avoid consumption of network and computing resources for a network operator device to receive an alarm associated with a KPI value that is not irregular, diagnose a cause of the alarm, and determine that the alarm does not indicate an error to be corrected. Additionally, by providing a severity of the anomaly, the network monitoring platform may conserve resources that may otherwise be consumed by a network operating device to attempt to correct relatively non-severe anomalies, while allowing a relatively severe network problem (that is indicated by a relatively severe anomalous KPI) to cause relatively severe errors (e.g., failed communication links, overloaded network nodes on communication links, and/or the like).

As indicated above, FIGS. 1A-1F are provided merely as one or more examples. Other examples may differ from what is described with regard to FIGS. 1A-1F.

Figure 2:
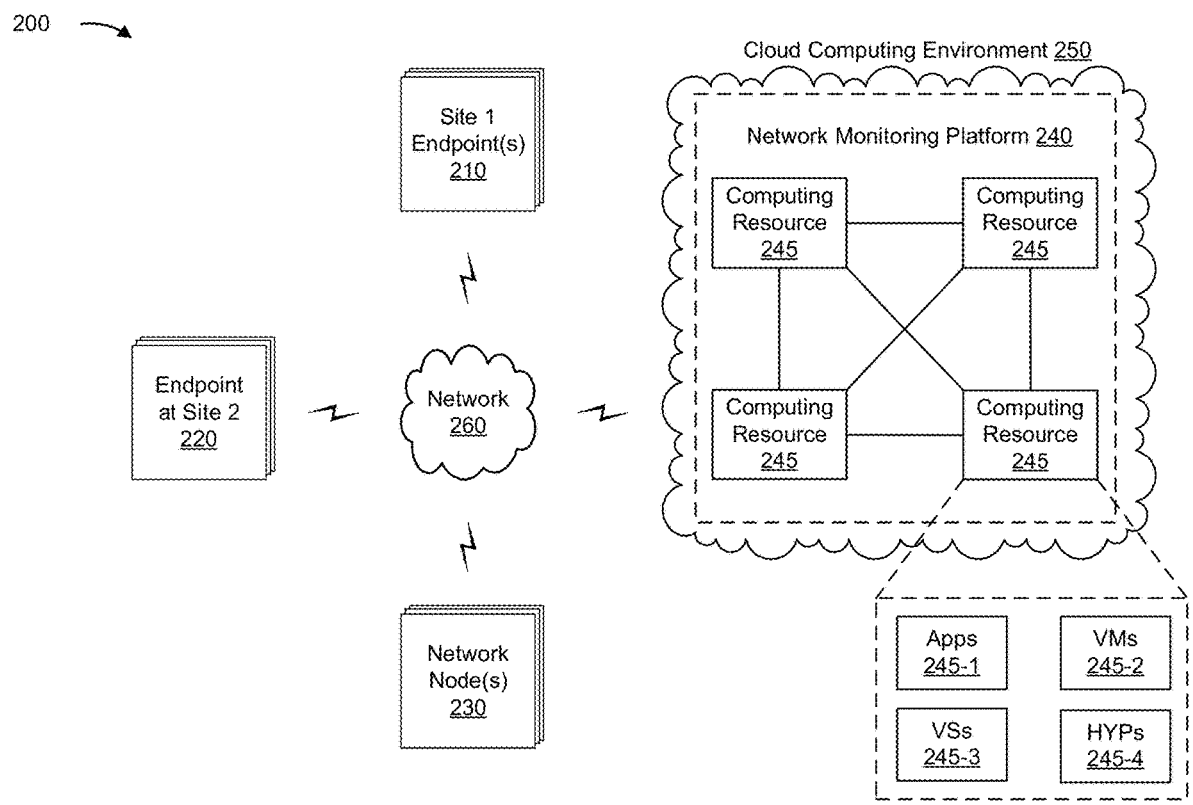
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more site 1 endpoints 210 (referred to herein individually as site 1 endpoint 210 or collectively as site 1 endpoints 210), one or more site 2 endpoints 220 (referred to herein individually as site 2 endpoint 220 or collectively as site 2 endpoints 220), one or more network nodes 230 (referred to herein individually as network node 230 or collectively as network nodes 230), a network monitoring platform 240, a computing resource 245, a cloud computing environment 250, and a network 260. Devices of environment 200 may interconnect via wired connections, wireless connections, or a combination of wired and wireless connections.

Site 1 endpoint 210 includes one or more devices capable of receiving and/or providing information over a network (e.g., network 260), and/or capable of generating, storing, and/or processing information received and/or provided over the network. For example, site 1 endpoint 210 may include a computing device, such as a laptop computer, a tablet computer, a handheld computer, a desktop computer, a mobile phone (e.g., a smart phone, a radiotelephone, and/or the like), a personal digital assistant, a network device (e.g., a router, a gateway, a firewall, a hub, a bridge, and/or the like), a telephone, or a similar device.

Site 2 endpoint 220 includes one or more devices capable of receiving and/or providing information over a network (e.g., network 260), and/or capable of generating, storing, and/or processing information received and/or provided over the network. For example, site 2 endpoint 220 may include a computing device, such as a laptop computer, a tablet computer, a handheld computer, a desktop computer, a mobile phone (e.g., a smart phone, a radiotelephone, and/or the like), a personal digital assistant, a network device (e.g., a router, a gateway, a firewall, a hub, a bridge, and/or the like), a telephone, or a similar device. Site 2 endpoint 220 may act as an endpoint (e.g., a source and/or a destination) for a communication with site 1 endpoint 210. For example, site 1 endpoint 210 may provide information to site 2 endpoint 220 (e.g., via network 260).

Network node 230 includes one or more devices capable of receiving, generating, storing, processing, and/or providing information associated with credit worthiness information of an individual. For example, network node 230 may include a communication and/or computing device, such as a server device, a desktop computer, a laptop computer, a tablet computer, a handheld computer, a mobile phone (e.g., a smart phone, a radiotelephone, and/or the like), or a similar type of device.

Network monitoring platform 240 includes one or more computing resources assigned to detect anomalies in network 260. For example, network monitoring platform 240 may be a platform implemented by cloud computing environment 250 that may monitor values of one or more KPIs to detect anomalies in network 260. In some implementations, network monitoring platform 240 is implemented by computing resources 245 of cloud computing environment 250.

Network monitoring platform 240 may include a server device or a group of server devices. In some implementations, network monitoring platform 240 may be hosted in cloud computing environment 250. Notably, while implementations described herein may describe network monitoring platform 240 as being hosted in cloud computing environment 250, in some implementations, network monitoring platform 240 may be non-cloud-based or may be partially cloud-based.

Cloud computing environment 250 includes an environment that delivers computing as a service, whereby shared resources, services, and/or the like may be provided to detect anomalies in network 260. Cloud computing environment 250 may provide computation, software, data access, storage, and/or other services that do not require end-user knowledge of a physical location and configuration of a system and/or a device that delivers the services. As shown, cloud computing environment 250 may include network monitoring platform 240 and computing resource 245.

Computing resource 245 includes one or more personal computers, workstation computers, server devices, or another type of computation and/or communication device. In some implementations, computing resource 245 may host network monitoring platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by site 1 endpoint 210 and/or site 2 endpoint 220. Application 245-1 may eliminate a need to install and execute the software applications on site 1 endpoint 210. For example, application 245-1 may include software associated with network monitoring platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., site 1 endpoint 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the "guest operating systems" and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
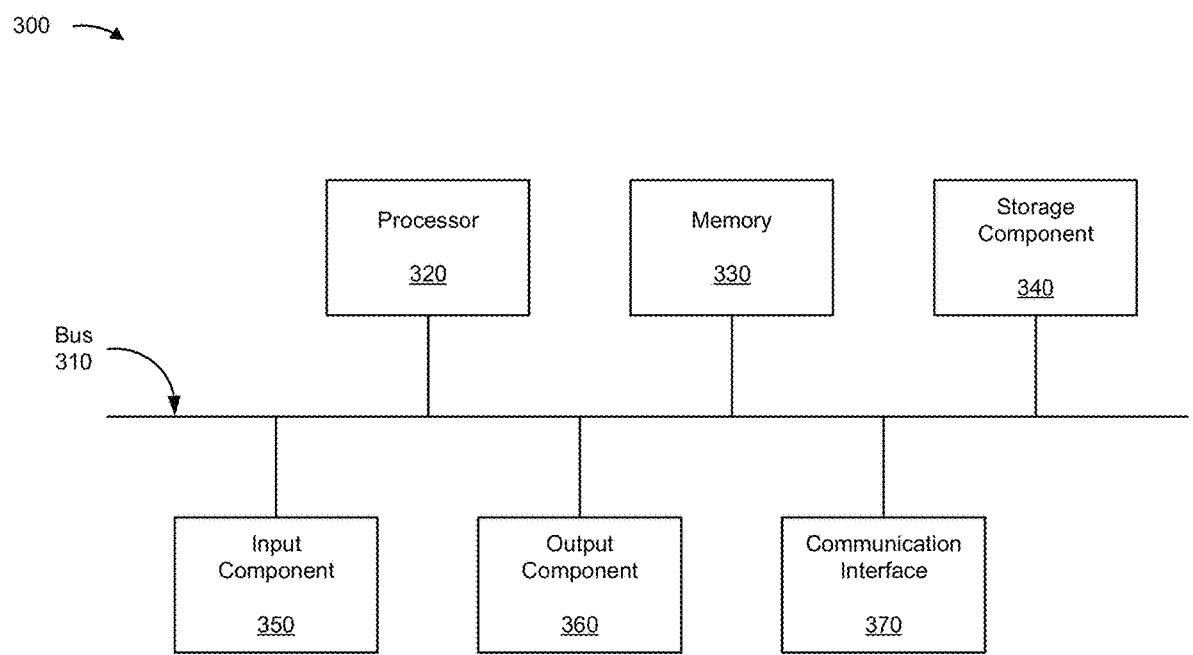
FIG. 3 is a diagram of example components of one or more devices of FIG. 2.

FIG. 3 is a diagram of example components of a device 300. Device 300 may correspond to site 1 endpoint 210, site 2 endpoint 220, network node 230, network node 230, network monitoring platform 240, and/or computing resource 245. In some implementations, site 1 endpoint 210, site 2 endpoint 220, network node 230, network node 230, network monitoring platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
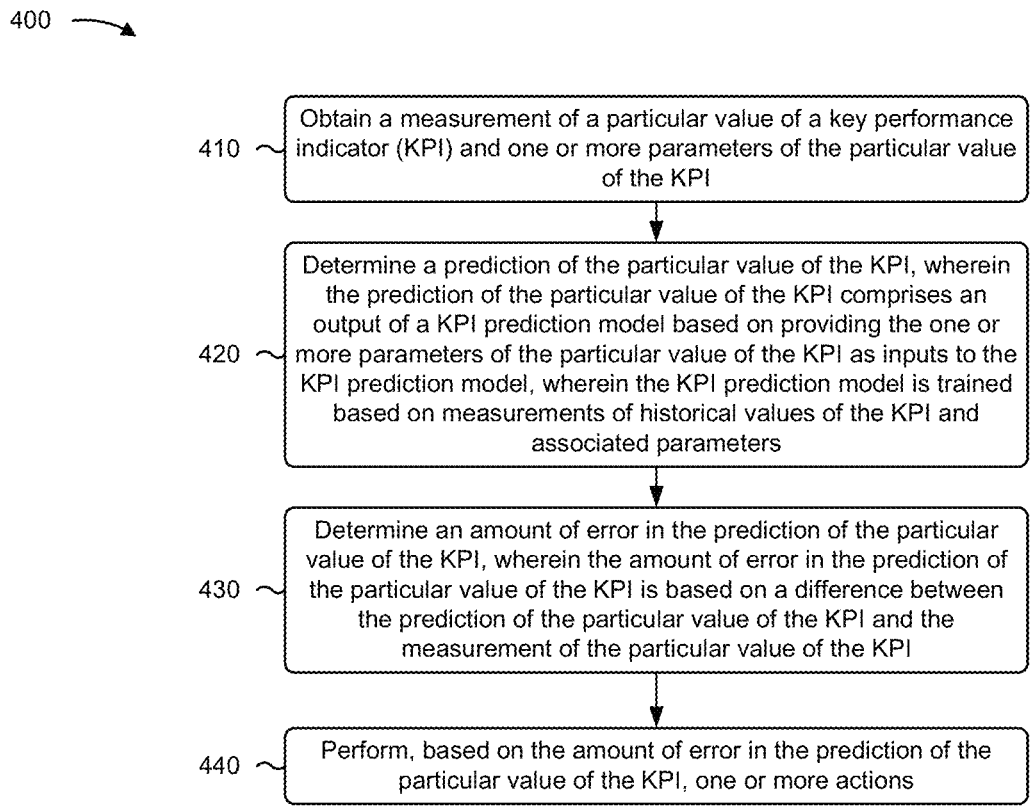
FIGS. 4-6 are flowcharts of example processes for anomaly detection in a network.

FIG. 4 is a flow chart of an example process 400 for anomaly detection in a network. In some implementations, one or more process blocks of FIG. 4 may be performed by a network monitoring platform (e.g., network monitoring platform 240). In some implementations, one or more process blocks of FIG. 4 may be performed by another device or a group of devices separate from or including the network monitoring platform, such as an endpoint at site 1 (e.g., site 1 endpoint 210), an endpoint at site 2 (e.g., site 2 endpoint 220), a network node (e.g., network node 230), and a computing resource (e.g., computing resource 245), and/or the like.

As shown in FIG. 4, process 400 may include obtaining a measurement of a particular value of a KPI and one or more parameters of the particular value of the KPI (block 410). For example, the network monitoring platform (e.g., using computing resource 245, processor 320, memory 330, storage component 340, input component 350, output component 360, communication interface 370 and/or the like) may obtain a measurement of a particular value of a KPI and one or more parameters of the particular value of the KPI, as described above.

As further shown in FIG. 4, process 400 may include determining a prediction of the particular value of the KPI, wherein the prediction of the particular value of the KPI comprises an output of a KPI prediction model based on providing the one or more parameters of the particular value of the KPI as inputs to the KPI prediction model, wherein the KPI prediction model is trained based on measurements of historical values of the KPI and associated parameters (block 420). For example, the network monitoring platform (e.g., using computing resource 245, processor 320, memory 330, storage component 340, input component 350, output component 360, communication interface 370 and/or the like) may determine a prediction of the particular value of the KPI, as described above. In some implementations, the prediction of the particular value of the KPI comprises an output of a KPI prediction model based on providing, by the device, the one or more parameters of the particular value of the KPI as inputs to the KPI prediction model. In some implementations, the KPI prediction model is trained based on measurements of historical values of the KPI and associated parameters.

As further shown in FIG. 4, process 400 may include determining an amount of error in the prediction of the particular value of the KPI, wherein the amount of error in the prediction of the particular value of the KPI is based on a difference between the prediction of the particular value of the KPI and the measurement of the particular value of the KPI (block 430). For example, the network monitoring platform (e.g., using computing resource 245, processor 320, memory 330, storage component 340, input component 350, output component 360, communication interface 370 and/or the like) may determine an amount of error in the prediction of the particular value of the KPI, as described above. In some implementations, the amount of error in the prediction of the particular value of the KPI is based on a difference between the prediction of the particular value of the KPI and the measurement of the particular value of the KPI.

As further shown in FIG. 4, process 400 may include performing, based on the amount of error in the prediction of the particular value of the KPI, one or more actions (block 440). For example, the network monitoring platform (e.g., using computing resource 245, processor 320, memory 330, storage component 340, input component 350, output component 360, communication interface 370 and/or the like) may perform, based on the amount of error in the prediction of the particular value of the KPI, one or more actions, as described above.

Process 400 may include additional implementations, such as any single implementation or any combination of implementations described below and/or in connection with one or more other processes described elsewhere herein.

In a first implementation, process 400 includes determining a prediction accuracy value for the KPI prediction model, wherein the prediction accuracy value is based on amounts of errors associated with predictions of historical values of the KPI; determining an anomaly threshold based on the prediction accuracy value; and performing an action, of the one or more actions, based on the amount of error in the prediction of the particular value of the KPI satisfying the anomaly threshold.

In a second implementation, alone or in combination with the first implementation, the one or more actions comprise: updating a prediction accuracy value based on the amount of error in the prediction of the particular value of the KPI, where the prediction accuracy value is based on amounts of errors in predictions of historical values of the KPI.

In a third implementation, alone or in combination with one or more of the first and second implementations, the one or more actions further comprise: updating an anomaly threshold based on updating the prediction accuracy value, where satisfaction of the anomaly threshold indicates that the particular value of the KPI is anomalous.

In a fourth implementation, alone or in combination with one or more of the first through third implementations, updating the prediction accuracy value comprises determining a weighted average of the amount of error in the prediction of the particular value of the KPI and amounts of respective errors in predictions of historical values of the KPI, where the weighting is based on respective ages of the predictions of the historical values of the KPI.

In a fifth implementation, alone or in combination with one or more of the first through fourth implementations, process 400 includes determining that the amount of error in the prediction of the particular value of the KPI fails to satisfy an anomaly threshold, where, based on the amount of error in the prediction of the particular value of the KPI failing to satisfy the anomaly threshold, the one or more actions comprise providing the measurement of the particular value of the KPI and the one or more parameters for further training of the KPI prediction model.

In a sixth implementation, alone or in combination with one or more of the first through fifth implementations, process 400 includes determining that the amount of error in the prediction of the particular value of the KPI satisfies an anomaly threshold, where the one or more actions comprise providing, to a network administration device and based on the amount of error in the prediction of the particular value of the KPI satisfying the anomaly threshold, an indication that the particular value of the KPI is anomalous.

In a seventh implementation, alone or in combination with one or more of the first through sixth implementations, process 400 includes determining that the amount of error in the prediction of the particular value of the KPI satisfies a first anomaly threshold; and determining that the amount of error in the prediction of the particular value of the KPI satisfies a second anomaly threshold, wherein satisfaction of the second anomaly threshold indicates that the particular value of the KPI is relatively severely anomalous, and wherein the one or more actions comprise providing, to a network administration device and based on the amount of error in the prediction of the particular value of the KPI satisfying the second anomaly threshold, an indication that the particular value of the KPI is relatively severely anomalous.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
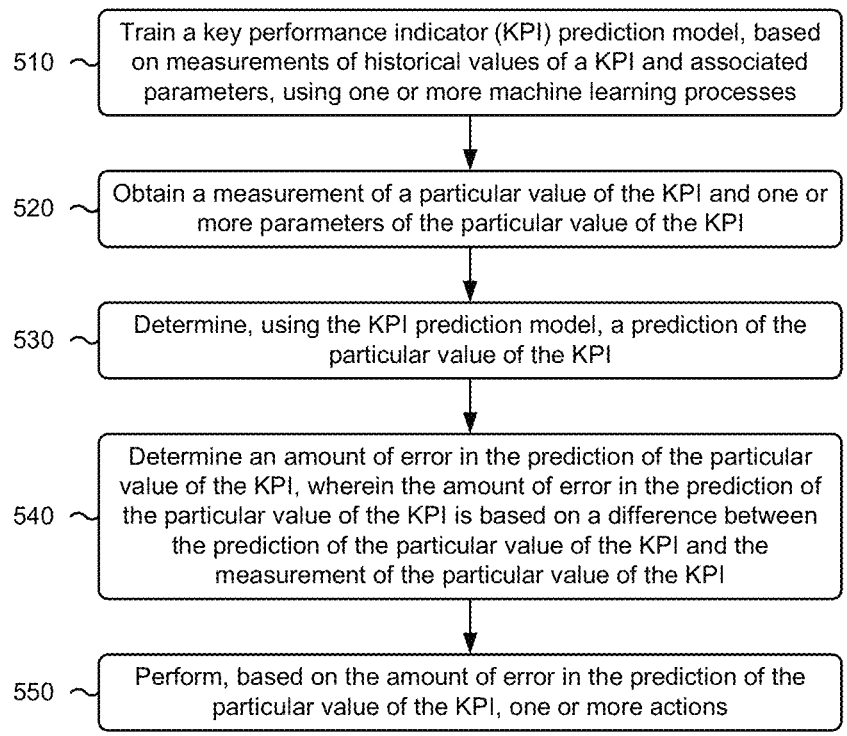

FIG. 5 is a flow chart of an example process 500 for anomaly detection in a network. In some implementations, one or more process blocks of FIG. 5 may be performed by a network monitoring platform (e.g., network monitoring platform 240). In some implementations, one or more process blocks of FIG. 5 may be performed by another device or a group of devices separate from or including the network monitoring platform, such as an endpoint at site 1 (e.g., site 1 endpoint 210), an endpoint at site 2 (e.g., site 2 endpoint 220), a network node (e.g., network node 230), and a computing resource (e.g., computing resource 245), and/or the like.

As shown in FIG. 5, process 500 may include training a KPI prediction model, based on measurements of historical values of a KPI and associated parameters, using one or more machine learning processes (block 510). For example, the network monitoring platform (e.g., using computing resource 245, processor 320, memory 330, storage component 340, input component 350, output component 360, communication interface 370 and/or the like) may train a KPI prediction model, based on measurements of historical values of a KPI and associated parameters, using one or more machine learning processes, as described above.

As further shown in FIG. 5, process 500 may include obtaining a measurement of a particular value of the KPI and one or more parameters of the particular value of the KPI (block 520). For example, the network monitoring platform (e.g., using computing resource 245, processor 320, memory 330, storage component 340, input component 350, output component 360, communication interface 370 and/or the like) may obtain a measurement of a particular value of the KPI and one or more parameters of the particular value of the KPI, as described above.

As further shown in FIG. 5, process 500 may include determining, using the KPI prediction model, a prediction of the particular value of the KPI (block 530). For example, the network monitoring platform (e.g., using computing resource 245, processor 320, memory 330, storage component 340, input component 350, output component 360, communication interface 370 and/or the like) may determine, using the KPI prediction model, a prediction of the particular value of the KPI, as described above.

As further shown in FIG. 5, process 500 may include determining an amount of error in the prediction of the particular value of the KPI, wherein the amount of error in the prediction of the particular value of the KPI is based on a difference between the prediction of the particular value of the KPI and the measurement of the particular value of the KPI (block 540). For example, the network monitoring platform (e.g., using computing resource 245, processor 320, memory 330, storage component 340, input component 350, output component 360, communication interface 370 and/or the like) may determine an amount of error in the prediction of the particular value of the KPI, as described above. In some implementations, the amount of error in the prediction of the particular value of the KPI is based on a difference between the prediction of the particular value of the KPI and the measurement of the particular value of the KPI.

As further shown in FIG. 5, process 500 may include performing, based on the amount of error in the prediction of the particular value of the KPI, one or more actions (block 550). For example, the network monitoring platform (e.g., using computing resource 245, processor 320, memory 330, storage component 340, input component 350, output component 360, communication interface 370 and/or the like) may perform, based on the amount of error in the prediction of the particular value of the KPI, one or more actions, as described above.

Process 500 may include additional implementations, such as any single implementation or any combination of implementations described below and/or in connection with one or more other processes described elsewhere herein.

In a first implementation, process 500 includes determining that the KPI prediction model has a prediction accuracy value that satisfies an accuracy threshold, wherein the prediction accuracy value is based on amounts of errors associated with predictions of historical values of the KPI; and determining, based on the prediction accuracy value satisfying the accuracy threshold, to use the KPI prediction model to determine the prediction of the particular value of the KPI.

In a second implementation, alone or in combination with the first implementation, process 500 includes: determining a prediction accuracy value for the KPI prediction model, wherein the prediction accuracy value is based on amounts of errors associated with predictions of historical values of the KPI; determining an anomaly threshold based on the prediction accuracy value; and performing an action of the one or more actions based on the amount of error satisfying the anomaly threshold.

In a third implementation, alone or in combination with one or more of the first and second implementations, the one or more actions comprise: updating a prediction accuracy value based on the amount of error in the prediction of the particular value of the KPI, where the prediction accuracy value is based on amounts of errors in predictions of historical values of the KPI.

In a fourth implementation, alone or in combination with one or more of the first through third implementations, the one or more actions comprise: updating an anomaly threshold based on updating the prediction accuracy value, where satisfaction of the anomaly threshold indicates that the particular value of the KPI is anomalous.

In a fifth implementation, alone or in combination with one or more of the first through fourth implementations, process 500 includes determining that the amount of error in the prediction of the particular value of the KPI fails to satisfy an anomaly threshold, wherein the one or more actions comprise further training the KPI prediction model based on the measurement of the particular value of the KPI and the one or more parameters.

In a sixth implementation, alone or in combination with one or more of the first through fifth implementations, process 500 includes determining that the amount of error in the prediction of the particular value of the KPI satisfies an anomaly threshold, wherein the one or more actions comprise providing, to a network administration device and based on the amount of error in the prediction of the particular value of the KPI satisfying the anomaly threshold, an indication that the particular value of the KPI is anomalous.

In a seventh implementation, alone or in combination with one or more of the first through sixth implementations, the one or more parameters of the particular value of the KPI comprise one or more of: a time of day associated with the measurement of the particular value of the KPI; a day of a week associated with the measurement of the particular value of the KPI; a date associated with the measurement of the particular value of the KPI; whether the measurement of the particular value of the KPI occurred on a holiday; or whether the measurement of the particular value of the KPI occurred on a weekend.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
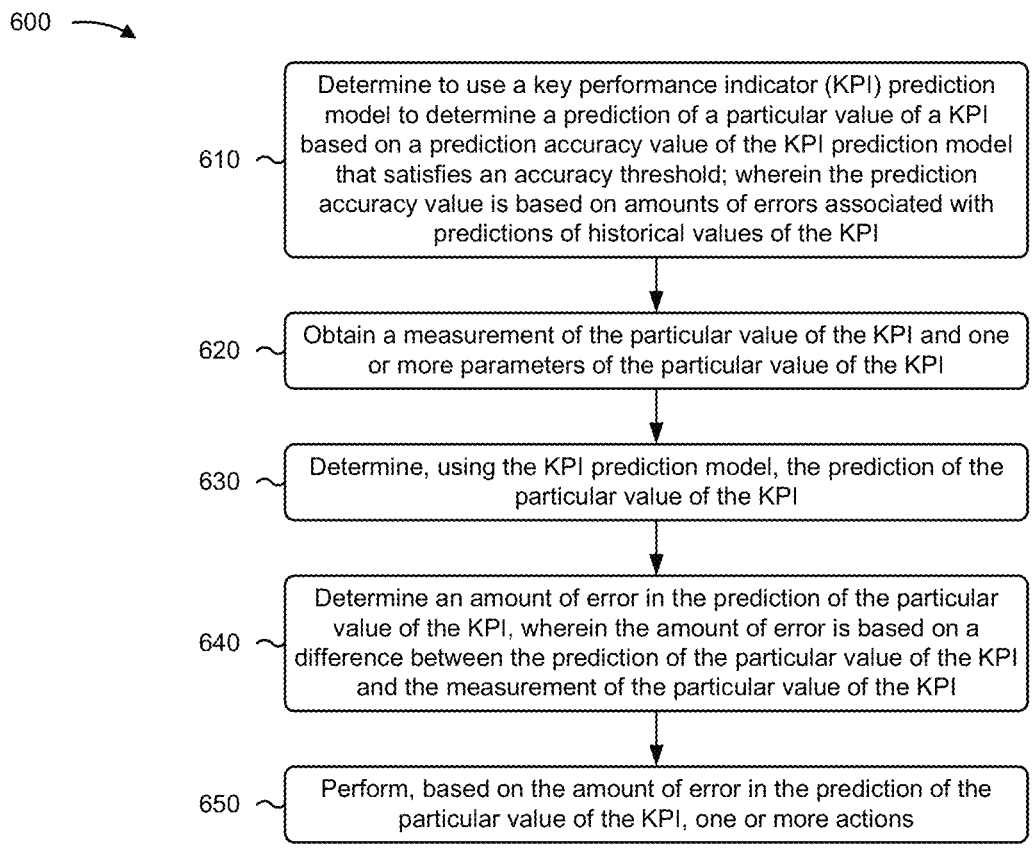

FIG. 6 is a flow chart of an example process 600 for anomaly detection in a network. In some implementations, one or more process blocks of FIG. 6 may be performed by a network monitoring platform (e.g., network monitoring platform 240). In some implementations, one or more process blocks of FIG. 6 may be performed by another device or a group of devices separate from or including the network monitoring platform, such as an endpoint at site 1 (e.g., site 1 endpoint 210), an endpoint at site 2 (e.g., site 2 endpoint 220), a network node (e.g., network node 230), a computing resource (e.g., computing resource 245), and/or the like.

As shown in FIG. 6, process 600 may include determining to use a KPI prediction model to determine a prediction of a particular value of a KPI based on a prediction accuracy value of the KPI prediction model that satisfies an accuracy threshold; wherein the prediction accuracy value is based on amounts of errors associated with predictions of historical values of the KPI (block 610). For example, the network monitoring platform (e.g., using computing resource 245, processor 320, memory 330, storage component 340, input component 350, output component 360, communication interface 370 and/or the like) may determine to use a KPI prediction model to determine a prediction of a particular value of a KPI based on a prediction accuracy value of the KPI prediction model that satisfies an accuracy threshold, as described above. In some implementations, the prediction accuracy value is based on amounts of errors associated with predictions of historical values of the KPI.

As further shown in FIG. 6, process 600 may include obtaining a measurement of the particular value of the KPI and one or more parameters of the particular value of the KPI (block 620). For example, the network monitoring platform (e.g., using computing resource 245, processor 320, memory 330, storage component 340, input component 350, output component 360, communication interface 370 and/or the like) may obtain a measurement of the particular value of the KPI and one or more parameters of the particular value of the KPI, as described above.

As further shown in FIG. 6, process 600 may include determining, using the KPI prediction model, the prediction of the particular value of the KPI (block 630). For example, the network monitoring platform (e.g., using computing resource 245, processor 320, memory 330, storage component 340, input component 350, output component 360, communication interface 370 and/or the like) may determine, using the KPI prediction model, the prediction of the particular value of the KPI, as described above.

As further shown in FIG. 6, process 600 may include determining an amount of error in the prediction of the particular value of the KPI, wherein the amount of error is based on a difference between the prediction of the particular value of the KPI and the measurement of the particular value of the KPI (block 640). For example, the network monitoring platform (e.g., using computing resource 245, processor 320, memory 330, storage component 340, input component 350, output component 360, communication interface 370 and/or the like) may determine an amount of error in the prediction of the particular value of the KPI, as described above. In some implementations, the amount of error is based on a difference between the prediction of the particular value of the KPI and the measurement of the particular value of the KPI.

As further shown in FIG. 6, process 600 may include performing, based on the amount of error in the prediction of the particular value of the KPI, one or more actions (block 650). For example, the network monitoring platform (e.g., using computing resource 245, processor 320, memory 330, storage component 340, input component 350, output component 360, communication interface 370 and/or the like)

may perform, based on the amount of error in the prediction of the particular value of the KPI, one or more actions, as described above.

Process 600 may include additional implementations, such as any single implementation or any combination of implementations described below and/or in connection with one or more other processes described elsewhere herein.

In a first implementation, process 600 includes determining an anomaly threshold based on the prediction accuracy value, and performing an action of the one or more actions based on the amount of error satisfying the anomaly threshold.

In a second implementation, alone or in combination with the first implementation, process 600 includes determining that the amount of error in the prediction of the particular value of the KPI fails to satisfy an anomaly threshold, wherein the one or more instructions, that cause the one or more processors to perform the one or more actions, cause the one or more processors to provide, based on the amount of error in the prediction of the particular value of the KPI failing to satisfy the anomaly threshold, the measurement of the particular value of the KPI and the one or more parameters for further training for the KPI prediction model.

In a third implementation, alone or in combination with one or more of the first and second implementations, process 600 includes determining that the amount of error in the prediction of the particular value of the KPI satisfies an anomaly threshold, wherein the one or more instructions, that cause the one or more processors to perform the one or more actions, cause the one or more processors to provide, to a network administration device and based on the amount of error in the prediction of the particular value of the KPI satisfying the anomaly threshold, an indication that the particular value of the KPI is anomalous.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device, a prediction of a particular value of a key performance indicator (KPI) based on a KPI prediction model trained on historical values of the KPI;
   determining, by the device, an amount of error in the prediction of the particular value of the KPI,
      wherein the amount of error in the prediction of the particular value of the KPI is based on a difference between the prediction of the particular value of the KPI and a measurement of the particular value of the KPI;
   determining, by the device, a weighting for a weighted average of the amount of error in the prediction of the particular value of the KPI and amounts of respective errors in predictions of the historical values of the KPI,
      wherein determining the weighting comprises:
         determining the weighting based on respective ages of the predictions of the historical values of the KPI; and
   determining, by the device and based on determining the weighting, a prediction accuracy value based on the amount of error in the prediction of the particular value of the KPI.

2. The method of claim 1, wherein the KPI prediction model is trained using one or more machine learning processes.

3. The method of claim 1, wherein the historical values of the KPI are measured during a particular period of time.

4. The method of claim 1, wherein determining the weighting comprises:
   determining the weighting based on a subset of the amounts of respective errors in the predictions of the historical values of the KPI,
      wherein the subset includes the amounts of respective errors in the predictions of the historical values of the KPI within a particular time threshold.

5. The method of claim 1, further comprising:
training the KPI prediction model using a neural network.

6. The method of claim 1, wherein determining the amount of error in the prediction of the particular value of the KPI comprises:
determining whether the amount of error in the prediction of the particular value of the KPI satisfies an anomaly threshold; and
further comprising:
updating the anomaly threshold based on determining the prediction accuracy value.

7. A device, comprising:
one or more memories; and
one or more processors, coupled to the one or more memories, configured to:
determine a prediction of a particular value of a key performance indicator (KPI) based on a KPI prediction model trained on historical values of the KPI;
determine an amount of error in the prediction of the particular value of the KPI,
wherein the amount of error in the prediction of the particular value of the KPI is based on a difference between the prediction of the particular value of the KPI and a measurement of the particular value of the KPI;
determine a weighting for a weighted average of the amount of error in the prediction of the particular value of the KPI and amounts of respective errors in predictions of the historical values of the KPI,
wherein the one or more processors, when determining the weighting, are configured to:
determine the weighting based on respective ages of the predictions of the historical values of the KPI; and
determine, based on determining the weighting, a prediction accuracy value based on the amount of error in the prediction of the particular value of the KPI.

8. The device of claim 7, wherein the KPI prediction model is trained using one or more machine learning processes.

9. The device of claim 7, wherein the historical values of the KPI are measured during a particular period of time.

10. The device of claim 7, wherein the one or more processors, when determining the weighting, are configured to:
determine the weighting based on a subset of the amounts of respective errors in the predictions of the historical values of the KPI,
wherein the subset includes the amounts of respective errors in the predictions of the historical values of the KPI within a particular time threshold.

11. The device of claim 7, wherein the one or more processors are further configured to:
train the KPI prediction model using a neural network.

12. The device of claim 7, wherein the one or more processors, when determining the amount of error in the prediction of the particular value of the KPI, are configured to:
determine whether the amount of error in the prediction of the particular value of the KPI satisfies an anomaly threshold; and
wherein the one or more processors are further configured to:
update the anomaly threshold based on determining the prediction accuracy value.

13. A non-transitory computer-readable medium storing a set of instructions, the set of instructions comprising:
one or more instructions that, when executed by one or more processors of a device, cause the device to:
determine a prediction of a particular value of a key performance indicator (KPI) based on a KPI prediction model trained on historical values of the KPI;
determine an amount of error in the prediction of the particular value of the KPI,
wherein the amount of error in the prediction of the particular value of the KPI is based on a difference between the prediction of the particular value of the KPI and a measurement of the particular value of the KPI;
determine a weighting for a weighted average of the amount of error in the prediction of the particular value of the KPI and amounts of respective errors in predictions of the historical values of the KPI,
wherein the one or more instructions, that cause the device to determine the weighting, cause the device to:
determine the weighting based on respective ages of the predictions of the historical values of the KPI; and
determine, based on determining the weighting, a prediction accuracy value based on the amount of error in the prediction of the particular value of the KPI.

14. The non-transitory computer-readable medium of claim 13, wherein the KPI prediction model is trained using one or more machine learning processes.

15. The non-transitory computer-readable medium of claim 13, wherein the historical values of the KPI are measured during a particular period of time.

16. The non-transitory computer-readable medium of claim 13, wherein the one or more instructions, that cause the device to determine the weighting, cause the device to:
determine the weighting based on a subset of the amounts of respective errors in the predictions of the historical values of the KPI,
wherein the subset includes the amounts of respective errors in the predictions of the historical values of the KPI within a particular time threshold.

17. The non-transitory computer-readable medium of claim 13, wherein the one or more instructions further cause the device to:
train the KPI prediction model using a neural network.

18. The method of claim 1, further comprising:
determining the particular value of the KPI is anomalous based on the prediction accuracy value.

19. The device of claim 7, wherein the one or more processors are further configured to:
determine a level of severity associated with the particular value of the KPI based on the prediction accuracy value.

20. The non-transitory computer-readable medium of claim 13, wherein the one or more instructions further cause the device to:
retrain the KPI prediction model based on the particular value of the KPI.

* * * * *